United States Patent [19]
Hamasaki

[11] Patent Number: 5,809,357
[45] Date of Patent: Sep. 15, 1998

[54] APERTURE SYSTEM

[75] Inventor: Takuji Hamasaki, Tokyo, Japan

[73] Assignee: Asahi Kogaku Kogyo Kabushiki Kaisha, Tokyo, Japan

[21] Appl. No.: 933,085

[22] Filed: Sep. 18, 1997

[30] Foreign Application Priority Data

Sep. 20, 1996 [JP] Japan ..................... 8-271626

[51] Int. Cl.⁶ ................. G03B 9/08; G03B 9/02
[52] U.S. Cl. ................. 396/449; 396/458; 396/505; 396/508; 396/510
[58] Field of Search ................. 396/449, 451, 396/452, 458, 462, 463, 493, 497, 498, 505, 506, 508, 510

[56] References Cited

U.S. PATENT DOCUMENTS 3,631,787  1/1972  Shimizu .................. 396/510
4,272,175  6/1981  Okura ..................... 396/510

*Primary Examiner*—Eddie C. Lee
*Attorney, Agent, or Firm*—Greenblum & Bernstein, P.L.C.

[57] ABSTRACT

An aperture system includes aperture blades defining an aperture opening and an aperture mechanism for moving the aperture blades, both of which are provided in a barrel. The aperture system further includes a motor, for driving the aperture mechanism, supported on a motor support fixed to the barrel, and a detecting device for detecting that the aperture mechanism is in a predetermined state. The motor is controlled based on a detection by the detecting device. The motor support is constructed so that the mounting angle of the motor is adjustable with respect to a rotation axis of the motor to change the timing of motor pulses of the motor with respect to the timing of the detection of the detection device.

17 Claims, 7 Drawing Sheets

APERTURE SYSTEM

BACKGROUND OF THE INVENTION

The present invention relates to an aperture system used in a camera.

An aperture system has a plurality of aperture blades defining an aperture diameter. In order to actuate the aperture blades, the aperture system generally includes two coaxial disks facing with each other such that the aperture blades are interposed therebetween. Each aperture blade is pivotably supported by the first disk. The second disk is a cam disk having cam grooves for moving the aperture blade. Each aperture blade is provided with a pin engaging a respective cam groove on the second disk. By rotating the first disk with respect to the second disk, the blades are moved to close and open the aperture.

The first disk is generally driven by a stepping motor. A control unit of the camera controls the stepping motor (that is, the rotation of the disk) by an "open-loop" control. A home position of the rotation of the first disk is set to a "fully-open" position wherein the blades fully-open the aperture opening. In order to detect that the first disk is positioned at the home position, the aperture system is further provided with a detecting sensor (a photo-sensor) which detects a reflector provided to a predetermined portion of the first disk. The detecting sensor is arranged to generate a detecting signal when the detecting sensor detects the reflector.

As shown in FIG. 1A, the control unit is arranged to recognize the home position of the first disk by the motor pulse "n" generated just after the detecting signal has generated. However, if the timing of the detecting signal is at the same time as the motor pulse of the stepping motor as shown in FIG. 1B, the timing of the detecting signal may deviate before and after the motor pulse "n". Thus, the control may determine the home position by motor pulse "n" or "n+1". Such erroneous recognition of the home position prevents the precise operation of the aperture system.

SUMMARY OF THE INVENTION

It is therefore an object of the present invention to provide an aperture system in which an erroneous recognition of the home position of the aperture can be prevented.

According to one aspect of the present invention, there is provided an aperture system including aperture blades defining an aperture opening, an aperture mechanism, a barrel, a motor, a motor support, a detecting device and a controller. The aperture mechanism is driven to move the aperture blades. The barrel accommodates the aperture blades and the aperture mechanism. The motor is for driving the aperture mechanism. The motor support is provided to the barrel for supporting the motor. The detecting device detects that the aperture mechanism is in a predetermined state. The controller controls the motor based on a detection by the detecting device. The motor support is constructed so that the mounting angle of the motor is adjustable with respect to a rotation axis thereof, so as to change the timing of motor pulses of the motor with respect to the timing of the detection of the detection device.

With such an arrangement, the timing of the motor pulse can be adjusted by adjusting the mounting angle of the stepping motor (with respect to the rotation axis thereof). Thus, if the timing of the detection of the detecting device is almost at the same time as the motor pulse of the motor, it is possible to change the relationship between the timing of the motor pulse and the detecting signal from the detecting device. Accordingly, the erroneous recognition of the home position of the aperture can be prevented to enable precise operation of the aperture system.

In a particular arrangement, the aperture mechanism includes a first and a second disk supporting the aperture blades therebetween. The aperture opening is controlled by rotating the first disk with respect to the second disk. One of the first and second disks pivotally supports the aperture blades, the other being a cam disk for moving the aperture blades. In this case, the detecting device is arranged to detect the position of the first disk.

In another particular arrangement, the detecting device includes a sensor provided to the second disk at a position where the sensor is able to detect a predetermined portion on the first disk. The sensor has a light-emitting portion which emits a light and a light receiving portion which receives the emitted light reflected by a subject.

In particular, the motor support is provided with grooves, the motor being fixed to the motor support by inserting bolts through the grooves and tightening nuts onto the bolts. Optionally, the motor support is provided with an indicating mark which indicates the mounting angle of the motor about the rotation axis of the motor. Further, the indicator includes scales spaced apart at an interval corresponding to an amount of one step of the motor divided by a certain number.

In another particular arrangement, there is provided a method including the steps of (1) detecting the difference of the timing of the detecting device and motor pulses of the motor, and (2) adjusting the mounting angle of the motor with respect to a rotation axis thereof based on the difference in the timing, to change the timing of motor pulses of the motor.

Particularly, the adjusting is operated so that the time interval after the detection of the detecting device, before the generation of the motor pulse, is within a predetermined time. Further, the motor support is provided with grooves, the motor being fixed to the motor support by inserting bolts through the grooves and tightening nuts onto the bolts. In this case, the adjusting steps further include the steps of (1) loosening the nut, (2) shifting the motor so as to adjust the mounting angle of the motor with respect to a rotation axis thereof, and (3) tightening the nut to fix the motor onto the motor support.

DESCRIPTION OF THE PREFERRED EMBODIMENT

The embodiment of the present invention is described with reference to the drawings.

Figure 1A:
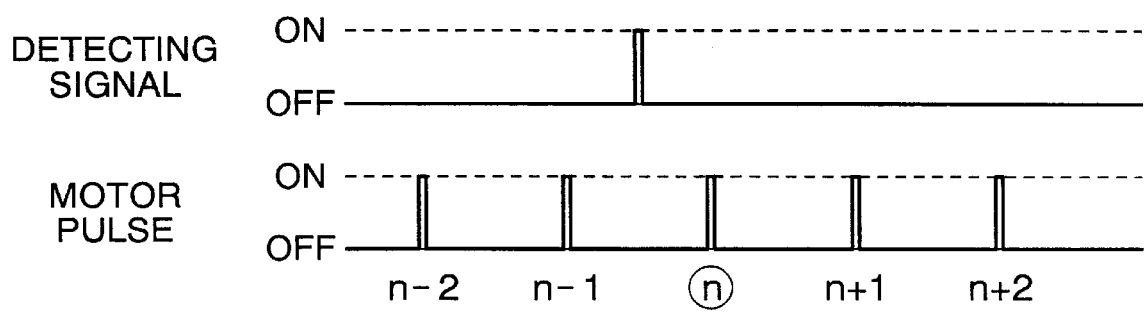
FIGS. 1A and 1B are timing charts showing the relationship between motor pulses and a detecting signal according to a conventional prior art aperture system.
Figure 1B:
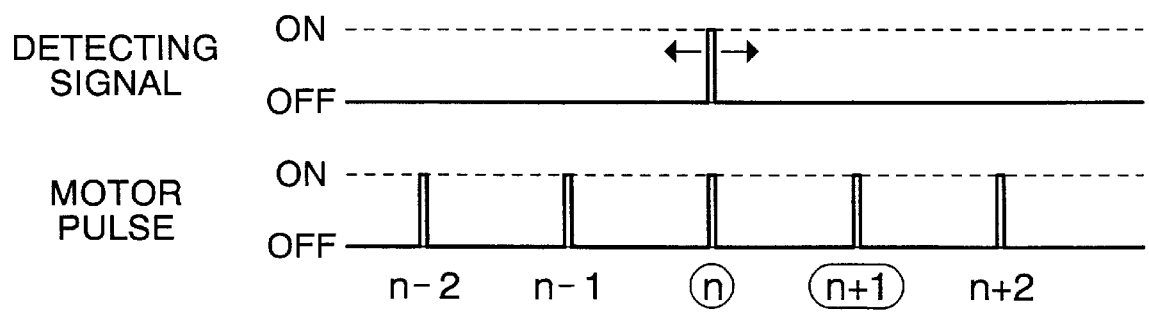
Figure 2:
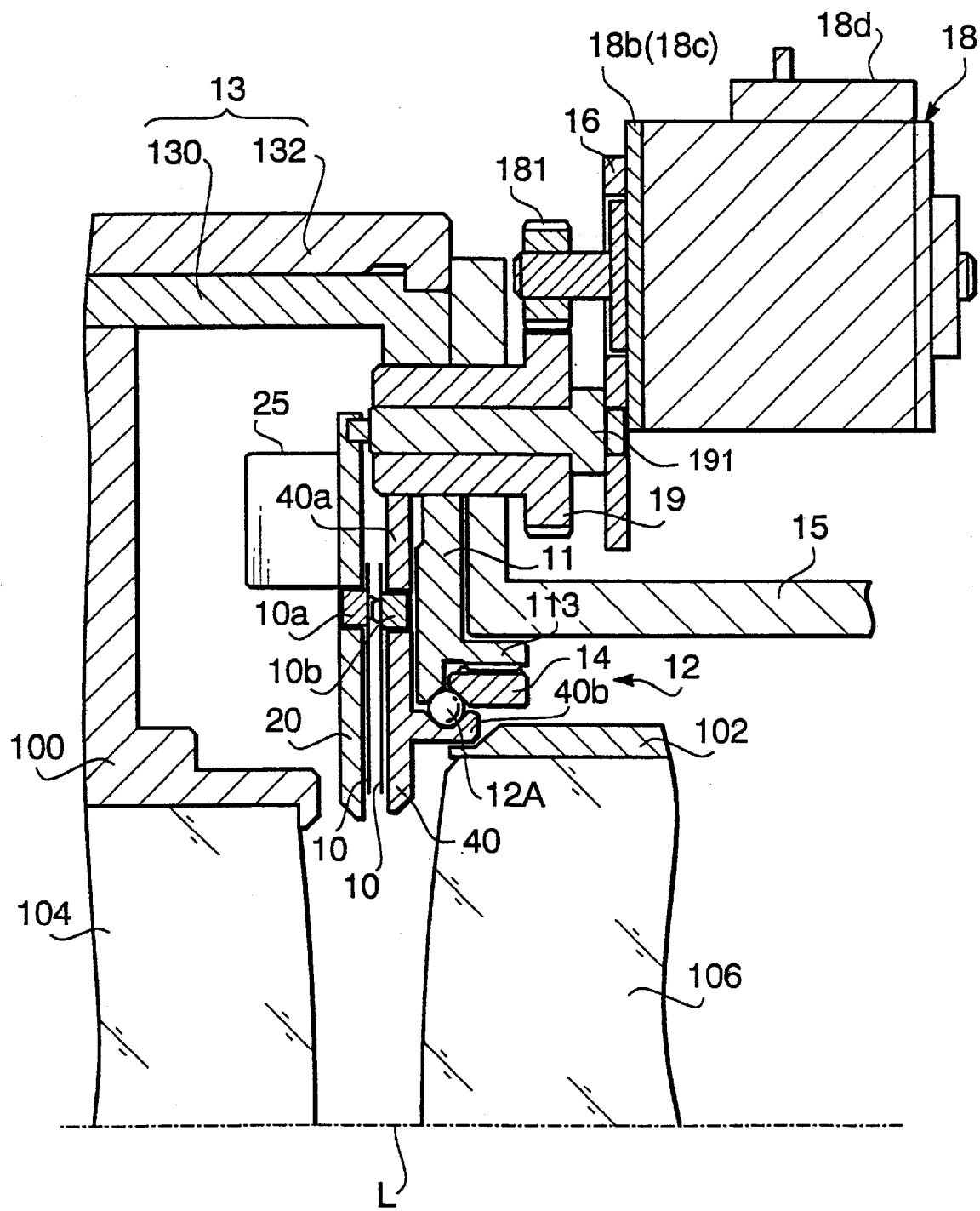
FIG. 2 is a sectional view of an aperture system according to an embodiment of the present invention.
Figure 3:
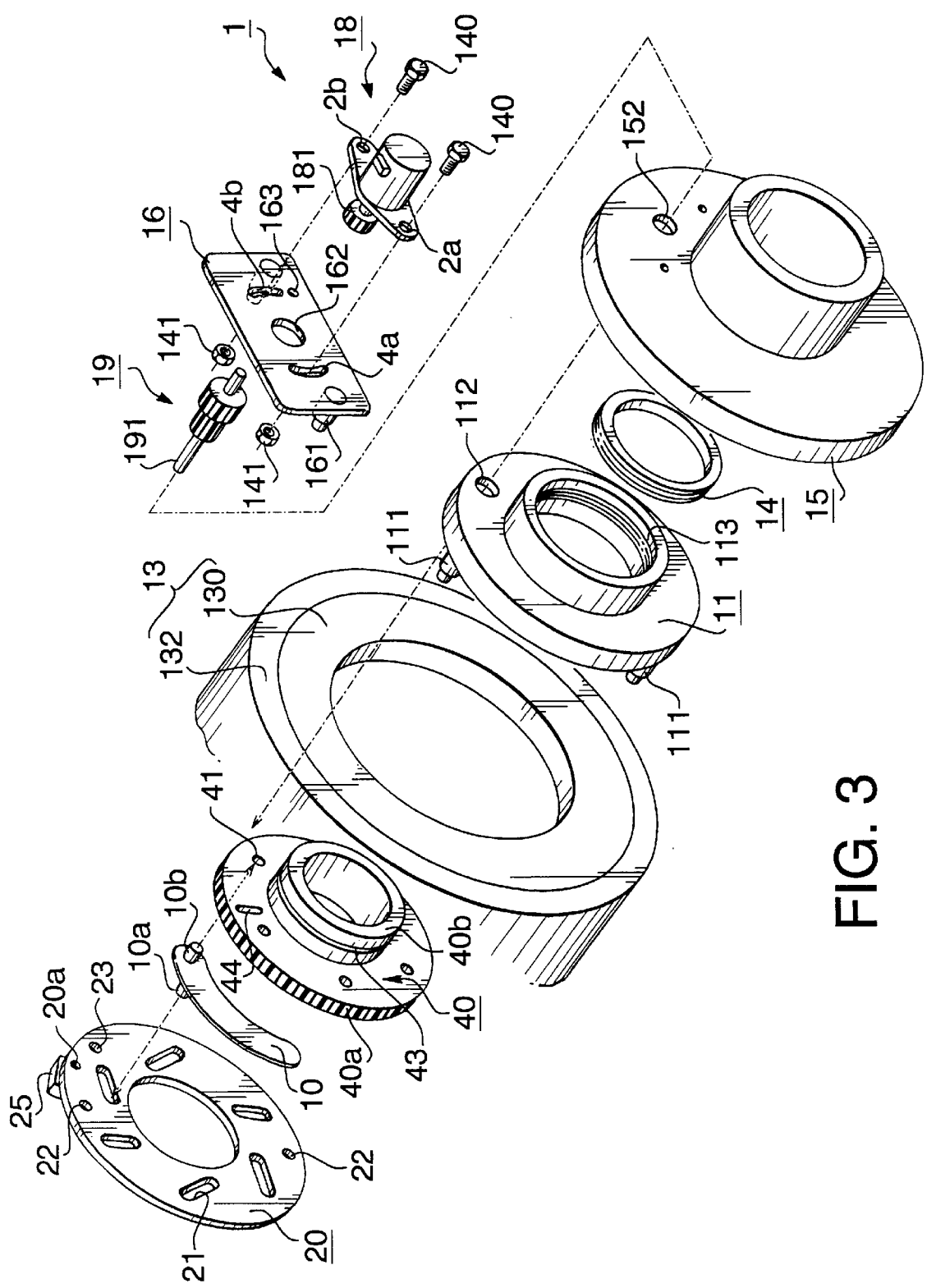
FIG. 3 is an exploded perspective view of the aperture system of FIG. 2.

FIGS. 2 and 3 are a sectional view and a perspective view of an aperture system provided in a lens barrel of a camera. As shown in FIG. 2, lenses 104 and 106 are accommodated in a lens barrel 13. The lenses 104 and 106 are respectively held by lens frames 100 and 102. The lens barrel 13 has a support ring 130 which supports the lens frames 100 and 102 so that the lens frame 100 is movable in the direction of an optical axis L, and a cam ring 132 provided around the support ring 130 for moving the lens frame 100 in the direction along the optical axis L.

Aperture blades are provided between the lens frames 100 and 102. As shown in FIG. 3 (only one of the aperture blades 10 is shown in FIG. 3), a cam disk 20 and a drive disk 40 are coaxially provided so that the aperture blades 10 are supported therebetween. Each aperture blade 10 has a pivot shaft 10b fitting into a support hole 41 of the drive disk 40, so that the aperture blade 10 is pivotably supported by the drive disk 40. The aperture blade 10 further has a cam pin 10a which engages a cam groove 21 formed on the cam disk 20. Thus, the rotation of the drive disk 40 moves the aperture blades 10 by means of the engagement of the cam pin 10a and the cam groove 21.

Figure 4A:
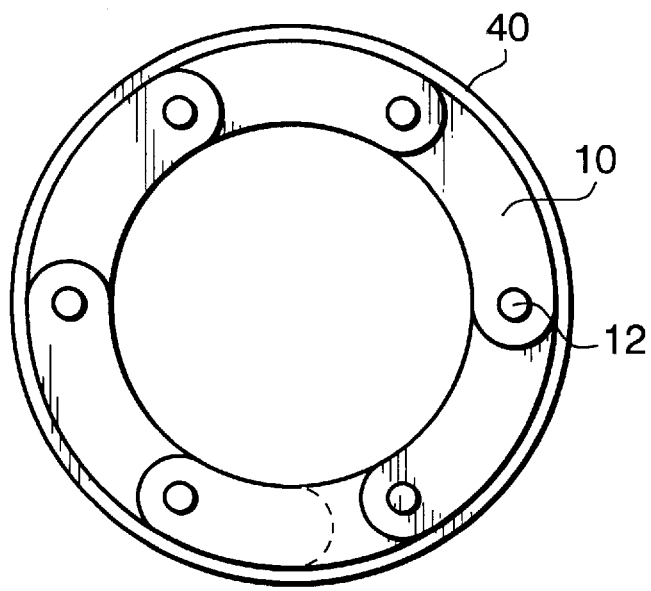
FIGS. 4A and 4B are schematic views showing the operation of aperture blades of the aperture system of FIG. 2.
Figure 4B:
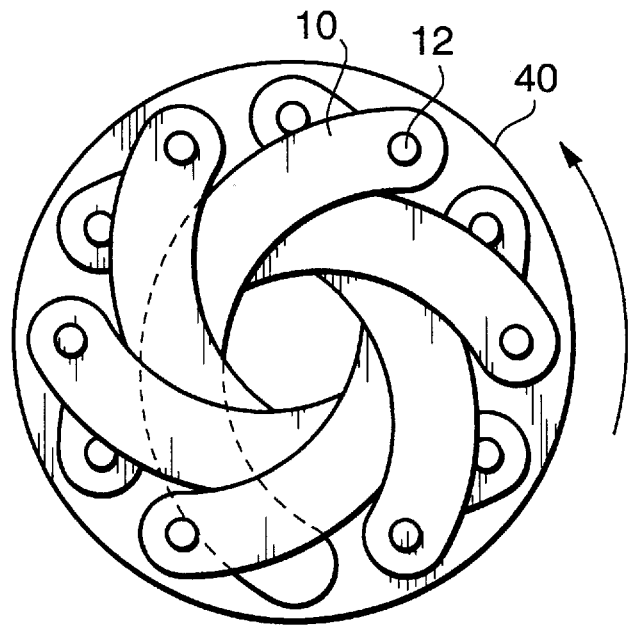

When the drive disk 40 is positioned at a predetermined position, the aperture blades 10 fully open the aperture opening as schematically shown in FIG. 4A. When the drive disk 40 is rotated, the aperture blades 10 are moved to form a substantially circular aperture (an iris) of desired diameter as shown in FIG. 4B.

As shown in FIG. 3, the drive disk 40 is mounted to the lens barrel 13 by a fixing disk 11. A ball bearing unit 12 is provided between the lens barrel 13 and the fixing disk 11, to rotatably support the drive disk 40. In particlular, the ball bearing unit 12 includes a peripheral groove 43 formed on a center cylindrical portion 40b of the drive disk 40. Balls 12a (FIG. 2) are provided in the groove 43 and a retainer 14 is provided for retaining the balls 12a. The retainer 14 has a external thread engaging an internal thread 113 formed on an inner surface of the fixing disk 11. The cam disk 20 is fixed to the fixing disk 11 with pillars 111 (planted on the fixing disk 11) interposed therebetween. In order that the pillars 111 do not interfere with the drive disk 40, the cam disk 20 has a larger diameter than the drive disk 40 and the pillars 111 fit into holes 22 formed adjacent to the periphery of the cam disk 20.

A mount frame 15 is provided to mount an aperture drive mechanism 1 for driving the drive disk 40. The mount frame 15 is fixed to the fixing disk 11 via not shown screws. The aperture drive mechanism 1 includes a stepping motor 18 having a pinion 181 fixed to a motor shaft thereof. For transmitting the rotation of the pinion 181 to the drive disk 40, the aperture drive mechanism 1 further has a transmission gear 19 meshed with the pinion 181. Holes 152 and 112 are formed on the mount frame 15 and the fixing disk 11 so that the transmission gear 19 protrudes therethrough to mesh with a gear portion 40a formed at the periphery of the drive disk 40. With this, the stepping motor 18 rotates the drive disk 40. As shown in FIG. 2, the stepping motor 18 is further provided with a connector portion 18d to which a cable (not shown) is connected, for electrically connecting the stepping motor 18 and the controller.

Figure 5:
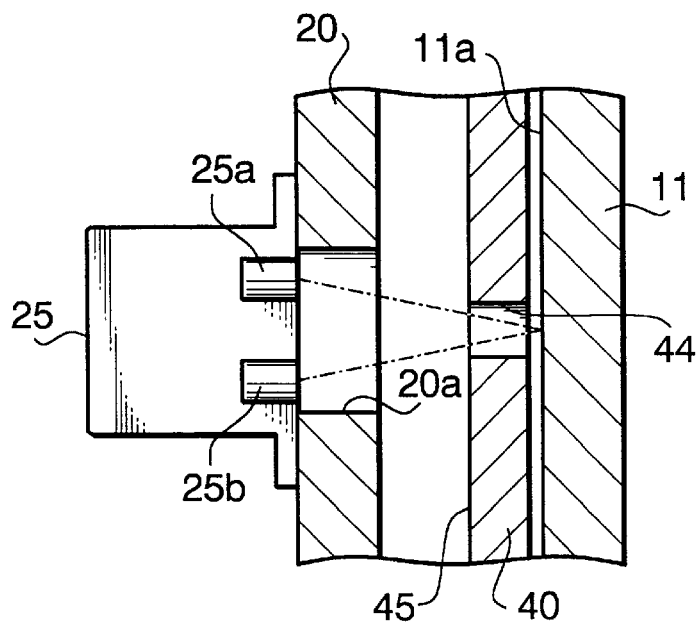
FIG. 5 is a sectional view of a detecting sensor of the aperture system of FIG. 2.

In order to detect the rotational position of the drive disk 40, the cam disk 20 is provided with a photo-sensor 25 at the side opposite to the drive disk 40. As shown in FIG. 5, the photo-sensor 25 has a light emitting portion 25a and a light receiving portion 25b. The cam disk 20 has an opening 20a and the drive disk 40 has a slit 44. The fixing disk 11 has a reflection surface 11a and the drive disk 40 has a non-reflection surface 45. With this, when the drive ring 40 is positioned at a predetermined position, the light emitted from the light emitting portion 25a is transmitted through the slit 44 and reflected at the reflection surface 11a, the reflected light returning to the light receiving portion 25b. The position of the drive disk 40 wherein the photo-sensor 25 detects the reflected light is set to a "home position" wherein the aperture blades 10 are fully opened as shown in FIG. 4A.

A controller of the camera is arranged to control the stepping motor 18 by an open-loop control based on the "home position" of the drive disk 40 detected by the photo-sensor 25, moving the aperture blades 10 inwardly from the full-open position thereof for obtaining the desired aperture. In particular, the controller of the camera detects the home position of the drive disk 40 by detecting the change in the photo-sensor 25 from OFF to ON. This change in the photo-sensor 25 from OFF as ON is referred to "detecting signal" hereinafter.

Figure 6:
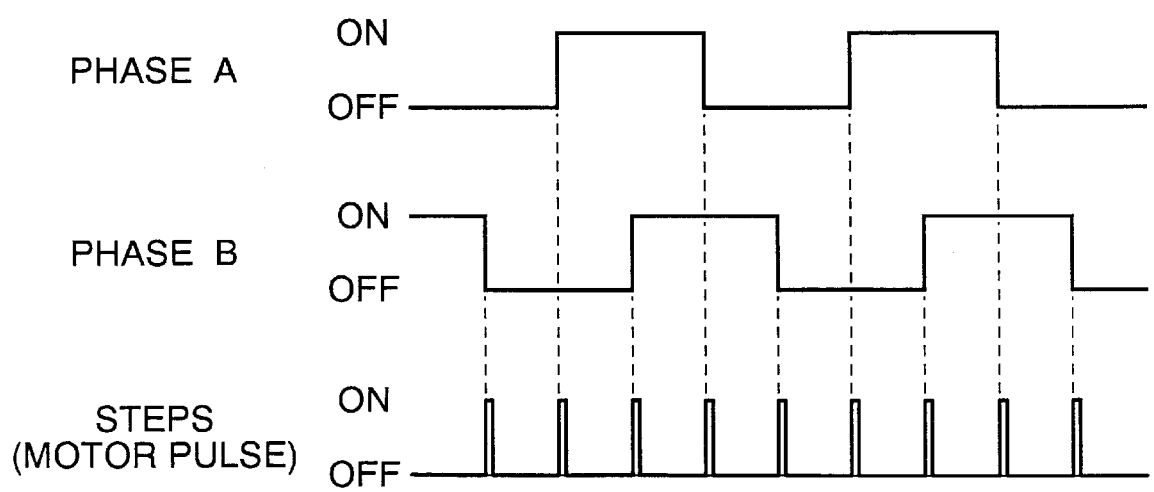
FIG. 6 is a timing diagram which shows motor pulses of the aperture system of FIG. 2.

The stepping motor 18 is driven by means of two-phase pulses, that is, a phase-A pulse and a phase-B pulse (shown in FIG. 6). The phase-A pulse advances from the phase-B pulse by ¼ cycle. The "steps" of the stepping motor 18 are created when each of phases A and B is turned OFF (from ON) or turned ON (from OFF). This stepping motor 18 has ten poles (one pole for 36° of rotation). The rotation of the stepping motor 18 is reduced to 1/30 by the transmission gear 19. With this, the drive disk 40 rotates 1.2° for every 36° of rotation of the stepping motor 18.

As shown in FIG. 3, the stepping motor 18 is supported by a motor support 16 fixed to the housing 15. The motor support 16 is provided with a center hole 162 through which the pinion 181 projects to mesh with the transmission gear 19. The motor support 16 is fixed to the mount frame 15 via pillars 161 so that there is a clearance between the mount frame 15 and the motor support 16. The pinion 181 and a larger gear of the transmission gear 19 are provided in the clearance. The transmission gear 19 is rotatably supported by a center shaft 191. One end of the center shaft 191 fit into a hole 163 formed on the motor support 16, while the other end of the center shaft 191 fit into a hole 23 formed on the cam disk 20.

Figure 7:
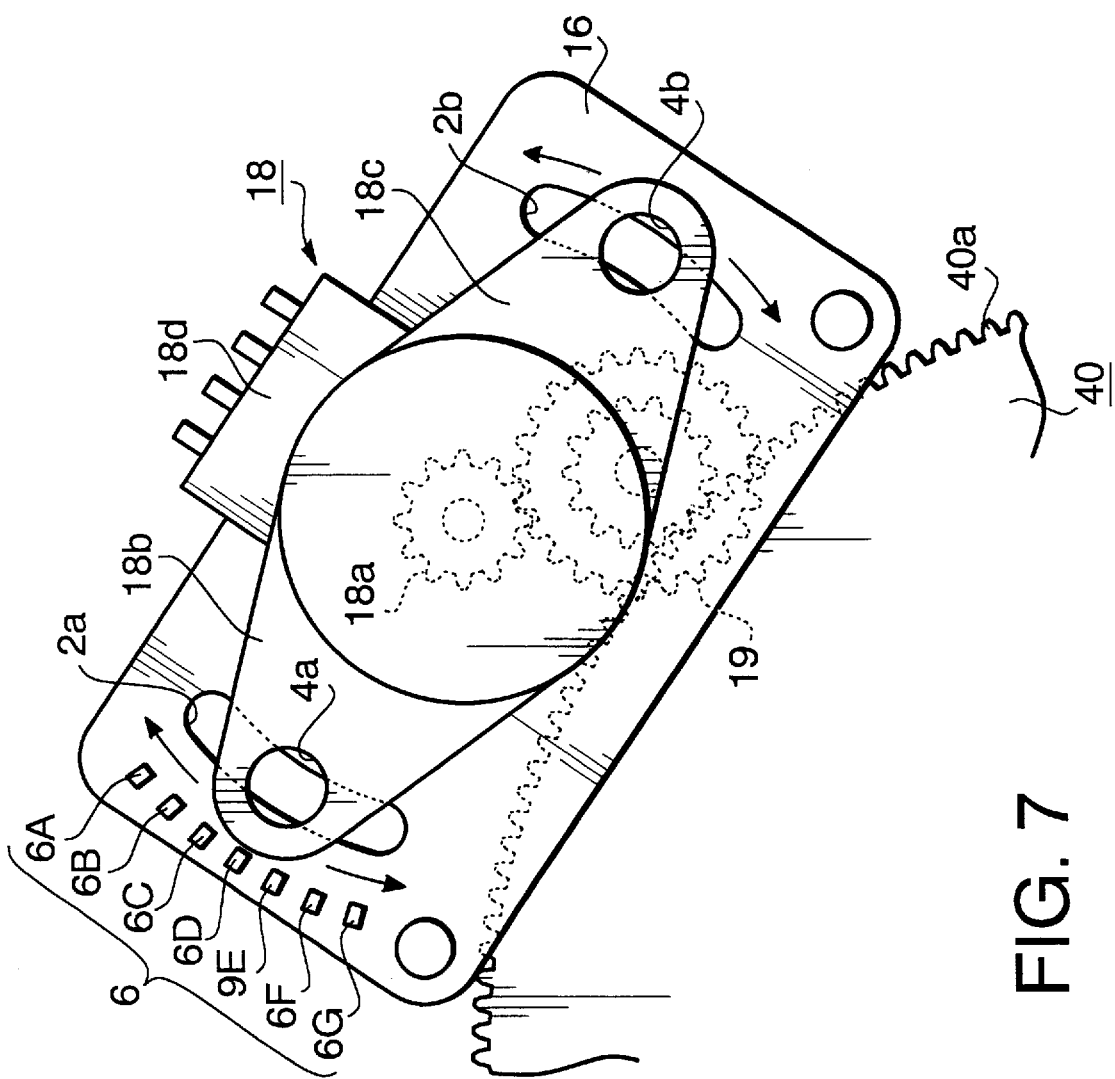
FIG. 7 is a front view of a motor support of the aperture system of FIG. 2.

FIG. 7 is a front view of the motor support 16. As shown in FIG. 7, the stepping motor 18 has flange portions 18b and 18c to be fixed onto the motor support 16. The flange portions 18b and 18c have holes 4a and 4b through which bolts 140 (FIG. 3) are inserted. The motor support 16 is provided with arc grooves 2a and 2b, through which the bolts 140 (FIG. 3) are inserted. The center of the curvature of the arc grooves 2a and 2b coincide with the rotation axis of the pinion 181 (that is, the rotation axis of the stepping motor 18). Thus, by tightening the nut 141 on the bolts 140 protruding through the holes 4a and 4b and the arc grooves 2a and 2b, the stepping motor 18 is mounted to the motor support 16. Further, the mounting angle of the stepping motor 18 about the rotation axis thereof can be adjusted by (1) loosening the nuts 141, (2) rotating the stepping motor 18 and (3) tightening the nuts 141 on the bolts 140 again.

In order to accurately and easily adjust the mounting angle of the stepping motor 18, an indicator mark 6 is provided besides one arc groove 2A on the motor support 16.

The indicator mark 6 includes 7 scales 6A through 6G. Each interval between adjacent scales corresponds to 6° of the rotation of the stepping motor 18.

The adjusting process is now described. The home position of the drive disk 40 is adjusted when the aperture system is assembled. First, the stepping motor 18 is temporarily mounted on the motor support 16. At this stage, the time interval between the detecting signal of the photo-sensor 18 and the motor pulses of the stepping motor 18 is measured by means of an oscilloscope.

Figure 8A:
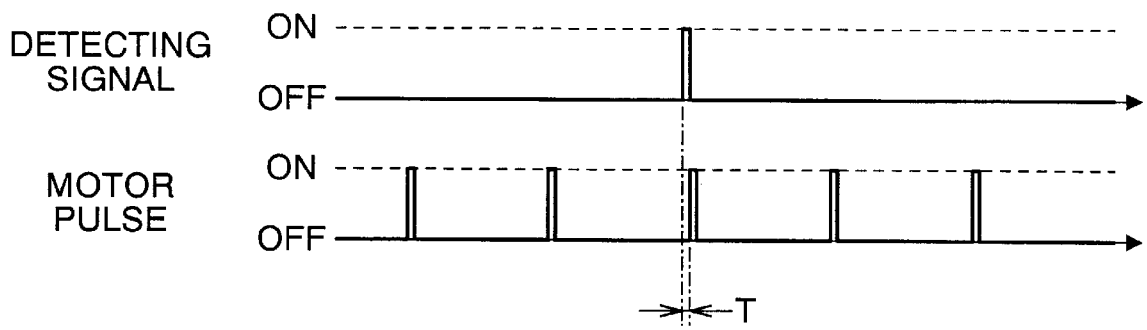
FIGS. 8A, 8B and 8C are timing charts showing the relationship between motor pulses and a detecting signal according to the present invention.
Figure 8B:
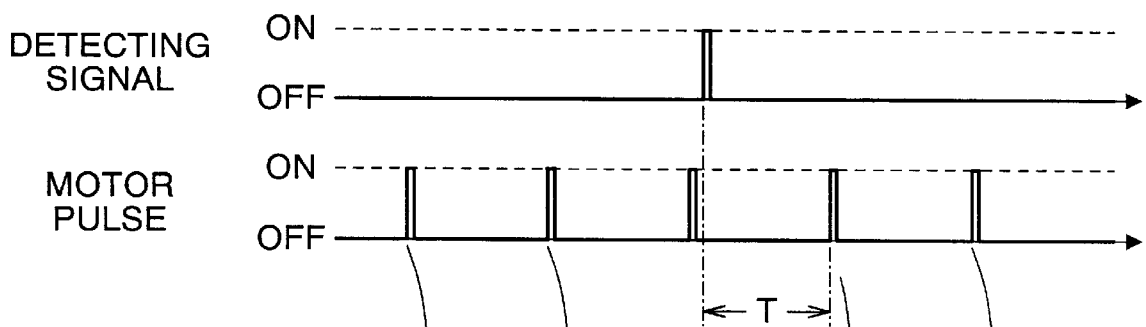
Figure 8C:
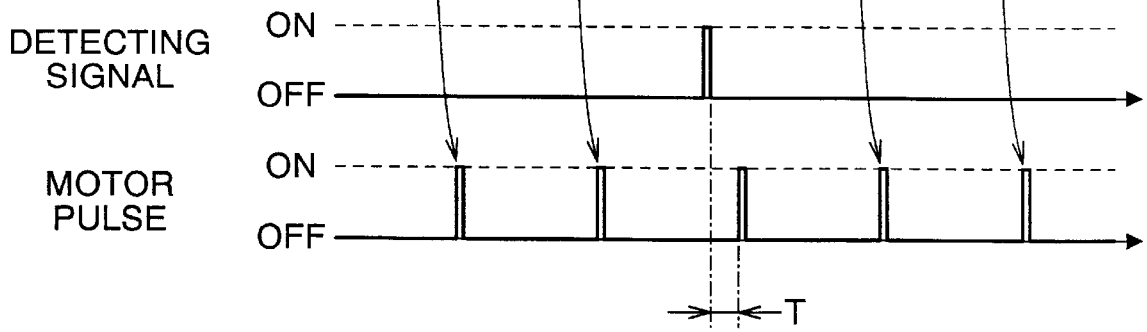

FIGS. 8A and 8B show the relationship between the detecting signal and the motor pulse. As described above, the controller recognizes the home position by a motor pulse generated just after the detecting signal of the photo-sensor 25. Therefore, if the detecting signal and the motor pulse are too close, the controller may mistakenly recognize the home position. Thus, the time interval after the detecting signal before the next motor pulse should be within a predetermined range. If the time interval T is less than or greater than the predetermined range (that is, the detecting signal and the motor pulse are too close) as shown in FIGS. 8A and 8B, the mounting angle of the stepping motor 18 is adjusted by almost 10° (corresponding to almost one and a half scales of scale mark 6). With this, the timing of the motor pulse is shifted by almost ¼ ($10/36$) of the motor pulse, which change the timing of motor pulses from FIG. 8B to FIG. 8C. Because the detecting signal of the photo-sensor 25 is not affected by the adjustment of the stepping motor 18, the time interval T is corrected as shown in FIG. 8C.

As described above, according to the embodiment, the timing of the motor pulse can be adjusted by adjusting the mounting angle of the stepping motor 18 with respect to the rotation axis thereof. Thus, if the timing of the detection of the photo-sensor 25 is close to the timing of the motor pulse of the stepping motor 18 (which may cause the erroneous recognition of the home position of the drive disk 40), it is possible to change the time interval after the detecting signal before the next motor pulse. Accordingly, the erroneous recognition of the home position of the aperture can be prevented, which enables precise operation of the aperture system.

In this embodiment, since there is a transmission gear 19 between the drive disk 40 and the stepping motor 18, the adjustment of the stepping motor 18 can be performed in a large scale (10°), which makes the adjusting operation easy. On the other hand, if an element connected to the drive disk 40 without the transmission gear 19 is made adjustable, the element should be adjusted in a small scale (less than 1°). In practice, such an adjusting operation is not easy.

Although the structure and operation of a aperture system thereof is described herein with respect to the preferred embodiment, many modifications and changes can be made without departing from the spirit and scope of the invention.

The present disclosure relates to subject matter contained in Japanese Patent Application No. HEI 08-271626 filed on Sep. 20, 1996 which is expressly incorporated herein by reference in its entirety.

What is claimed is:

1. An aperture system comprising:
   aperture blades defining an aperture opening;
   an aperture mechanism driven to move said aperture blades;
   a barrel accommodating said aperture blades and said aperture mechanism;
   a motor for driving said aperture mechanism;
   a motor support provided to said barrel for supporting said motor;
   a detecting device which detects that said aperture mechanism is in a predetermined state; and
   a controller which controls said motor based on a detection by said detecting device;
   said motor support being constructed so that the mounting angle of said motor is adjustable with respect to a rotation axis thereof, to change the timing of motor pulses of said motor with respect to the timing of the detection of said detection device.

2. The aperture system according to claim 1, said aperture mechanism comprising a first and a second disk supporting said aperture blades therebetween, wherein said aperture opening is controlled by rotating said first disk with respect to said second disk.

3. The aperture system according to claim 2, wherein one of said first and second disks pivotally supports said aperture blades, and the other disk being a cam disk for moving said aperture blades.

4. The aperture system according to claim 3, in which said detecting device is arranged to detect the rotational position of said first disk.

5. The aperture system according to claim 4, said detecting device comprising a sensor provided to said second disk at a position where said sensor is able to detect a predetermined portion of said first disk.

6. The aperture system according to claim 5, wherein said sensor has a light-emitting portion which emits a light and a light receiving portion which receives the emitted light reflected by a subject.

7. The aperture system according to claim 1, further comprising a transmission gear which transmits the rotation of said gear to said aperture mechanism.

8. The aperture system according to claim 1, wherein said motor support is provided with grooves, said motor being fixed to said motor support by inserting bolts through said grooves and tightening nuts onto said bolts.

9. The aperture system according to claim 1, wherein said motor support is provided with an indicating mark which indicates the mounting angle of said motor about the rotation axis of said motor.

10. The aperture system according to claim 9, wherein said indicator includes scales spaced apart at an interval corresponding to an amount of one step of said motor divided by a predetermined number.

11. The aperture system according to claim 1, wherein said motor is a stepping motor.

12. A method for adjusting a home position of an aperture system, said aperture system comprising an aperture mechanism which is driven by a motor to move aperture blades, a detecting device which detects that said aperture mechanism is in a predetermined state, and a controller which controls said motor based on a detection by said detecting device,
    said method comprising:
    detecting the difference of the timing of said detecting device and motor pulses of said motor; and
    adjusting the mounting angle of said motor with respect to a rotation axis of said not or based on said difference in said timing, to change the timing of motor pulses of said motor.

13. The method according to claim 12, in which said adjusting operates so that the time interval after the detection of said detecting device before the generation of said motor pulse is within a predetermined time.

14. The method according to claim 12, said aperture mechanism comprising a first and a second disk supporting said aperture blades therebetween, wherein said aperture opening is controlled by rotating said first disk with respect to said second disk.

15. The method according to claim 12, in which said detecting device is arranged to detect the position of said first disk.

16. The method according to claim 12, in which said aperture system further comprises a motor support for supporting said motor, wherein said motor support is provided with grooves, and said motor is fixed to said motor support by inserting bolts through said grooves and tightening nuts onto said bolts.

17. The method according to claim 16, wherein said adjusting further comprises:

loosening said nuts;

shifting said motor so as to adjust the mounting angle of said motor with respect to a rotation axis of said not or; and tightening said nuts to fix said motor onto said motor support.

* * * * *